United States Patent
Parkin et al.

[15] 3,700,905
[45] Oct. 24, 1972

[54] MULTIPLE ELEMENT SENSING APPARATUS

[72] Inventors: William J. Parkin, Natick; Joe C. Wilson, Jr., Pepperell, both of Mass.

[73] Assignee: Sanders Associates, Inc., Nashua, N.H.

[22] Filed: Nov. 4, 1964

[21] Appl. No.: 409,355

[52] U.S. Cl. ......250/203 R, 250/83.3 H, 250/211 K, 338/17, 338/18, 356/141
[51] Int. Cl..............................................G01s 3/78
[58] Field of Search......250/200, 203, 204, 210, 215, 250/216; 343/121

[56] References Cited

UNITED STATES PATENTS

2,418,308   4/1947   Luck ....................343/121
2,476,977   7/1949   Hansel..................343/121

Primary Examiner—Rodney D. Bennett, Jr.
Assistant Examiner—Daniel C. Kaufman
Attorney—Louis Etlinger

[57] ABSTRACT

A multiple field optical signal detection apparatus employing a plurality of rotating field detector areas of increasing size, each such area corresponding to an increasing field of view. Each detector area includes a plurality of outer input electrodes and an inner output electrode. A pair of quadrature-phased, alternating current bias signals are applied to corresponding axis-defining pairs of input electrodes. Each output electrode is coupled to a switch which switches from one detector area to another corresponding with its respective field of view. The detector is coupled to a servo system which orients the detector along an axis corresponding with a signal source. The detector areas may be searched with a sweep signal sequentially to provide position signals for a plurality of signals.

15 Claims, 6 Drawing Figures

INVENTORS
WILLIAM J. PARKIN
JOE C. WILSON, JR.

David A. Rich

BY ATTORNEY

INVENTORS
WILLIAM J. PARKIN
JOE C. WILSON, JR.

BY David A. Rich

ATTORNEY

MULTIPLE ELEMENT SENSING APPARATUS

The present invention relates generally to radiant energy sensing apparatus and devices. More particularly, the invention relates to optical and near optical frequency radiant energy sensing apparatus and devices. More especially, the invention relates to infrared tracking apparatus devices for detecting and tracking an optical image of a remote light transmitting object in the presence of a plurality of remote light transmitting objects.

This application presents an improvement relating to co-pending applications entitled RADIANT ENERGY DETECTOR, Ser. No. 253,503, filed Jan. 23, 1963; TRACKING SYSTEM, Ser. No. 253,504, filed Jan. 23, 1963; TRACKING CIRCUIT, Ser. No. 272,181, filed Apr. 5, 1963; and RADIANT ENERGY DETECTION APPARATUS, Ser. No. 399,111, filed Sept. 24, 1964.

The apparatus, systems and devices disclosed in the above-noted co-pending applications are all directed to the problem of sensing, detecting and tracking a selected target through a single common aperture. It is frequently desirable, however, to operate a tracking system for example, with multiple fields of view operating through a common aperture and a common detection axis. Such an application for a tracking system might involve for example, two modes of operation. In the acquisition or search mode it is very desirable for the system to operate with a relatively wide field of view. When a target has been acquired, it is then useful to track the target with a relatively narrow field of view.

Another application which is highly desirable involves the display of a plurality of targets from signals received through a common aperture. Given indications of a plurality of such targets, it is very useful to track a selected target.

It is therefore an object of the invention to provide an improved radiant energy sensing apparatus having a relatively wide field of view for one mode of operation and a relatively narrow field of view for another mode of operation.

Another object of the invention is to provide an improved radiant energy sensing apparatus capable of producing separable indications of a plurality of remote objects.

Yet another object of the invention is to provide an improved radiant energy sensing apparatus for producing an indication of a selected one of a plurality of remote objects while rejecting the others.

Still another object of the invention is to provide an improved radiant energy sensing apparatus for displaying a plurality of indications of a plurality of remote objects.

A still further object of the invention is to provide an improved radiant energy detection means adapted for the simultaneous detection of a plurality of radiant energy images impingent thereon.

Other and further objects of the invention will be apparent from the following description thereof, taken in connection with the accompanying drawings, and its scope will be pointed out in the appended claims.

In accordance with the invention there is provided radiant energy sensing apparatus. The apparatus includes radiant energy detection means having a plurality of coaxial radiation responsive areas surrounding a detection axis. Alternating current bias means are coupled to the detection means for coupling quadrature phased bias signals through the areas. Output means are coupled to the detection means for producing an output signal.

In accordance with one form of the invention, focusing means are provided for receiving an image of a remote transmitting object. A first pair of quadrature phased bias signals are coupled through an inner section of the radiation responsive areas. A second pair of quadrature phased bias signals are coupled through an outer section of the areas.

In still another form of the invention, the two pairs of quadrature phased bias signals have a first frequency and a second frequency respectively. Inner means are coupled to the inner filter areas for producing a first frequency output signal indicative of an object signal within the inner area. Outer filter means are coupled to the outer area for producing a second frequency signal indicative of an object signal within the outer area. Switching means are coupled to the inner and outer filter means for disabling, in response to the first frequency output signal, the second frequency output signal.

In still another form of the invention each of the radiation responsive areas are in insulated overlapping relation and have a plurality of input bias electrodes and an output centrally disposed electrode.

Figures 1, 2:
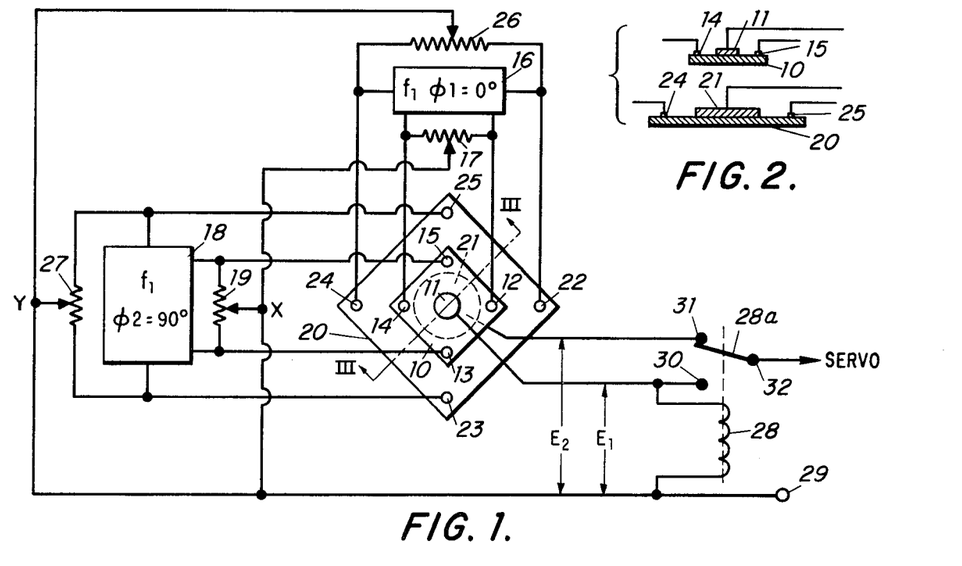
FIG. 1 is a schematic circuit diagram of a multiple element sensing apparatus embodying the invention.
FIG. 2 is a partially exploded, sectional view of the detector cell taken along the lines III—III in FIG. 1.

DESCRIPTION AND EXPLANATION OF THE APPARATUS IN FIGS. 1 AND 2.

With reference to the drawings and with particular reference to FIGS. 1 and 2, there is here illustrated a multiple element sensing apparatus embodying the invention. The apparatus illustrated may be used in a tracking system as described and illustrated in the co-pending applications. For use in tracking remote radiating objects an optical system is employed which is not shown for purposes of clarity. The optical system captures the image of the remote object and focuses it on a detector cell. An output control signal orients the optical axis to correspond with the tracking axis as determined by the remote object. The servo system for orienting the optical head is described and illustrated in the co-pending applications. The apparatus as shown in FIGS. 1 and 2 includes a pair of photosensitive detector elements connected for operation as a pair of rotating field detectors. A smaller, inner cell overlaps a larger, outer cell. Each cell has four input bias electrodes and an output centrally disposed electrode. A pair of quadrature phased, alternating current input bias signals are applied through the input bias electrodes of each cell. The output of the inner cell is coupled to a relay which controls the application of either the inner or the outer output signals to the servo system.

An inner photoconductive detector cell 10 has a centrally disposed output electrode 11 and four radially symmetrically disposed input bias electrodes 12, 13, 14 and 15. The diagonally opposed, axis defining terminals 12 and 14 define, for example, a horizontal or azimuth axis. The diagonally opposed, axis defining electrodes 13 and 15 define for example, a vertical or elevation axis. The terminals 12 and 14 are coupled to a source of alternating current bias signal from a generator 16. The output of the generator 16 is characterized by a selected frequency $f_1$, for example, 400 cycles, and at a selected phase, for example, $\Phi 1 = 0°$. The terminals 13 and 15 are coupled to a source of bias signal at the same frequency from a generator 18. The bias signal from the generator 18 has a relative phase, $\Phi 2 = 90°$, and is thus in quadrature with the signal from the generator 16. Coupled in parallel with the generator 16 is a balancing potentiometer 17 having its movable tap coupled to the movable tap of a potentiometer 19 coupled in parallel with the generator 18. The taps are coupled together at a junction indicated as X.

An outer photoconductor cell 20 extends beyond the cell 10 which overlaps it as shown particularly in FIG. 2. The cell 20 has a centrally disposed output electrode 21 and four radially symmetrically disposed input bias electrodes 22, 23, 24 and 25. The cell 10 thus presents an inner detection area and the cell 20 an outer detection area.

The horizontal or azimuth terminals 22 and 24 are coupled to a second output of the generator 16 and in parallel to a balancing potentiometer 26. The vertical or elevation terminals 23 and 25 are coupled to a second output of the generator 18 and in parallel to a balancing potentiometer 27. The movable taps of the potentiometers 26 and 27 are coupled together at a junction referenced Y and to the junction referenced X between the movable taps of the potentiometers 17 and 19. The output of the inner cell from the output electrode 11 is here indicated at $E_1$ and is coupled through a double throw, single pole relay 28. The junction between the movable taps is coupled to the relay coil and to a terminal 29. The electrode 11 is coupled to a contact 30 and the outer electrode 21 is coupled to a contact 31 of the relay 28. The pole 28a of the relay 28 is shown connecting the contact 31 and a pivot contact 32 about which the pole 28a moves. The contact 32 is indicated as being coupled to the servo system which is described in the co-pending applications.

Detector elements of the type which are useful in the present invention are described in my copending application, Ser. No. 253,504.

Thus, detector elements which change electrical characteristics in response to radiation are broadly useful in the invention. Of particular use in the invention are detector elements having a variable impedance or resistivity, or conversely, conductivity, in response to radiation. The change in impedance may be due to the well-known photoelectric effect or to energy absorption.

Photoelectric devices for sensing the presence of infrared energy are broadly classified photovoltaic and photoconductive. The photovoltaic infrared detectors produce a voltage in response to the presence of infrared. The photoconductive detectors provide a variable conductivity in response to the presence of infrared energy.

Radiation absorption materials of the type used for bolometers for radiation intensity measurements epitomize an absorption-type detector. Resistive material of this character is marketed under the name "Thermistor" by Barnes Engineering Company, Stamford, Connecticut.

Typical prior art circuits use a photoconductive infrared detector placed in series with a direct current bias source and a load impedance. The impingement of infrared energy upon the infrared detector cell has the effect of increasing its conductivity to produce a higher voltage across a load impedance. In effect, the cell and the load impedance provide a potentiometer to produce an output direct current signal which is a function of the amount of infrared energy impingent on the cell.

To provide an indication of the location of a target, prior art systems typically utilize a rotating vane or reticle which partially obscures the cell and rotates about the central axis of the cell. The system produces a null error signal when the target is precisely on bore-sight, that is, along the central axis of the optical cell and its associated optical system. The output voltage across the load impedance is a constant. While the target is located off the axis, the exposure of the cell to infrared energy varies with the position of the vane. In effect, the rotating vane provides a modulation which appears as an alternating current component across the load impedance. The amplitude of the modulating signal is a function of the degree of offset of the target from the boresight axis.

This prior art system is primarily a null seeking system. When the target image is displaced from the boresight axis, an error signal is produced. The error signal is an alternating signal superimposed on the direct current signal. The phase of the error signal indicates, when compared with a reference signal, the error in direction, and the amplitude, the degree of displacement or offset from the boresight axis.

Such prior art systems are subject to the disadvantages of rotating mechanical devices. These disadvantages include lack of reliability and a limitation on the possible information rate. The mechanical limitations on infrared information rate, for example, are quite important in the presence of an intermittent source of radiation.

In an article entitled "Application of the Lateral Photoeffect to a Tracking System" by C. L. Patterson appearing in "Infrared Physics", 1962 Volume 2, pages 75–85, Porganson Press, Ltd., Great Britain, the photovoltaic detector element utilizing the so-called lateral photoelectric effect is described. Physically, this system utilizes a photovoltaic detector cell with four terminals. The system, however, is completely distinguishable from the present invention in that it utilizes the photovoltaic effect; that is, it produces an output direct current in response to the impingement of infrared energy.

A modulation signal is produced with the use of a rotating mechanical vane or reticle. The only real advantage of this system is to provide two-dimensional information in the form of a pair of orthogonal signals in the output. The circuitry, however, is enormously complicated in order to provide the desired result.

In contrast, the sensing apparatus of the present invention provides two-dimensional information without any mechanical parts, and furthermore, uses the four terminal connections to the cell to introduce a pair of alternating current bias signals in phase quadrature. This concept is completely alien to the device disclosed by Patterson.

The Patterson system is thus subject to the same inadequacies and disadvantages of the other prior art devices which require a mechanical rotating element to provide an indication of target location.

The expression "radiation responsive, variable impedance", as used herein, includes, but is not limited to, impedance changes due to electromagnetic radiation in its various forms impingent, e.g., upon a detector element. The terms thermoelectric, thermovoltaic, thermoconductive and thermosensitive, as used herein, are analogous to photoelectric, photovoltaic, photoconductive and photosensitive in that a variation in an electrical characteristic takes place in response to radiation of a thermal or optical character. Thermoconductive materials vary in impedance due to absorption of energy whatever the radiation frequency. Such materials, in the first order, vary in impedance with temperature. Since the temperature varies with radiation absorption, the impedance varies in response to radiation. While the invention is typically utilized in conjunction with optical and near optical frequencies, it will be apparent that many types of radiation are well within the scope of the inventions.

A cell useful in a system embodying the invention is typically formed in the following manner:

A blank of transparent supporting material provides a supporting plate. The plate, for example, may be 0.75 inches square. The supporting plate is transparent to the radiant energy of interest. For infrared energy, a quartz plate is suitable. The plate may be, e.g., 0.04 inches thick. A layer of photoconductive material, for example, lead sulphide, is applied to the center area of the plate in the form, for example, of a square of the order of 0.22 inches per side. Within the corners of the square, gold contacts are evaporated onto the lead sulphide. Connection wires are connected to the gold contacts and extend at right angles from the surface. A potting compound is then applied to cover the lead sulphide surface area in order to provide a support for the contacts and sensitive material.

OPERATION

The inner cell 10 is normally biased with the signals from the generators 16 and 18. The cell is balanced horizontally by varying the potentiometer 17 when the cell is drawing only dark current to produce zero volts between the terminal 29 and the contact 30. Similarly, the cell 10 is balanced vertically by varying the potentiometer 19 to produce zero volts in the dark current condition between the terminal 29 and the contact 30.

In like manner, the cell 20 is balanced horizontally by varying the potentiometer 26 and vertically by varying the potentiometer 27 to produce zero volts between the terminal 29 and the contact 31.

When a target image or light spot impinges upon the exposed photosensitive area of the cell 20, the cell is unbalanced in such a manner as to produce an output signal having resolvable horizontal and vertical components at the output electrode 21. A target image which impinges on the inner cell 10 produces an output signal at the electrode 11 which is coupled to the relay 28 and energizes it. The pole 28a then completes a connection between the contacts 30 and 32 to disable the outer cell 20. The circuit as shown operates to produce an output signal from the outer cell 20 only when the inner cell has no impingent light image. An image on the cell 10 thus operates to exclude the detection area extending beyond the cell 10.

The apparatus of FIG. 1 thus provides a sensing system which can be used for tracking with a wide field of view while retaining the advantages of tracking with a relatively narrow field of view through a common aperture. In the search mode, the wide field of view associated with the outer cell 20 hunts for the presence of a target. When the system finds the target it operates to drive it into the region of the inner cell 10 and provides a narrow field of view. By introducing relatively high gain into the circuit associated with the inner cell 10, exceedingly high pointing accuracy can be obtained. In the event that the target image suddenly leaves the region of the inner cell 10 due for example, to some violent maneuver, the system automatically switches back to the search or acquisition mode through a relatively wide field of view to recapture the target and restore it to the region of the inner cell. While the switching mechanism is shown as a relay in FIG. 1, a faster device such as a solid state switch or electronic gate circuit may be employed.

Figure 3:
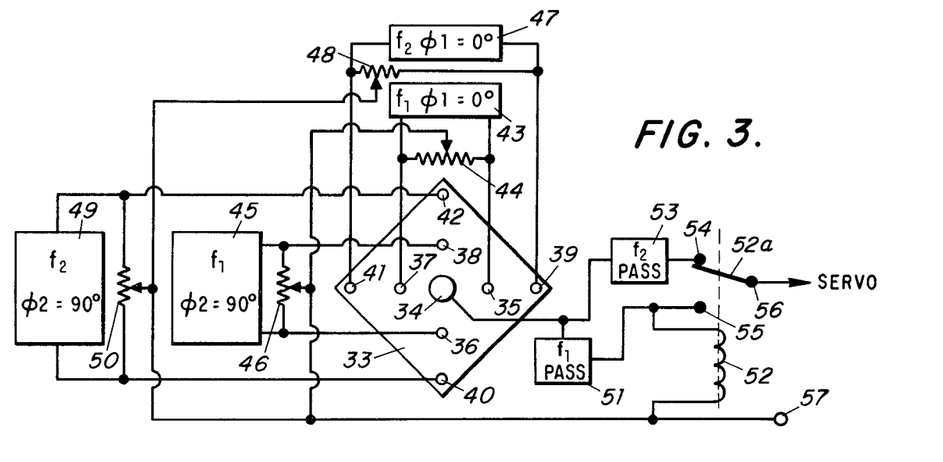
FIG. 3 is a schematic circuit diagram embodying a modification of the apparatus in FIG. 1.

DESCRIPTION AND EXPLANATION OF THE APPARATUS IN FIG. 3

Referring now to FIG. 3, there is here illustrated a modification of the apparatus in FIG. 1 in which a single detector cell is used with an inner set of input bias electrodes and an outer set of input bias electrodes. Here a single central output electrode is used. The signal corresponding to the outer detection area is distinguishable from the signal corresponding to the inner detection area in frequency.

A photoconductive detector element 33 has a centrally disposed output electrode 34 and an inner set of bias electrodes 35, 36, 37 and 38 surrounding the electrode 34 and defining an inner radiant energy sensing area. A set of outer input bias electrodes 39, 40, 41 and 42 surround the inner electrodes 35–37 and define an outer energy sensing area. The electrode pairs 35, 37 and 39, 41 define a horizontal or azimuth axis and the electrodes pairs 36, 38 and 40, 42 define a vertical or elevation axis. Coupled to the electrode pair 35, 37 is an inner input bias generator 43 and, in parallel, a balancing potentiometer 44. The bias signal from the generator 43 is characterized by a first selected frequency $f_1$ at a relative phase $\Phi 1 = 0°$. Coupled to the electrode pair 36, 38 is an inner bias generator 45 and a parallel balancing potentiometer 46. The bias signal from the generator 45 has the same frequency $f_1$ as the signal from the generator 43 and is in phase quadrature, i.e., $\Phi 2 = 90°$. The movable taps on the potentiometer 44 and 46 are coupled together to an output terminal 57.

Coupled to the electrode pair 39, 41 is an outer bias generator 47 in parallel with a balancing potentiometer 48. The bias signal from the generator 47 is characterized by a second selected frequency $f_2$ which differs from the frequency of the signal from generator 43. The relative phase of the signal from the generator 47 is $\Phi 1 = 0°$. Coupled to the electrode pair 40, 42 is an outer bias generator 49 in parallel with a balancing potentiometer 50. The bias signal from the generator 49 is characterized by frequency $f_2$ and is in phase quadrature, i.e., $\Phi 2 = 90°$, relative to the signal from the generator 47. The movable taps of the potentiometers 48 and 50 are coupled together to the junction between the movable taps of the potentiometers 44 and 46. The electrode 34 is coupled through an $f_1$ pass filter 51 to the coil of a relay 52 and to the contact 55 of the relay 52. The other side of the coil 52 is coupled to the terminal 57. The electrode 34 is also coupled through an $f_2$ pass filter 53 to contact 54 of the relay 52, the pole 52a and pivot contact 56 of the relay 52 for coupling to the servo circuit.

OPERATION

Balancing of the circuit in FIG. 3 is accomplished in a manner similar to that described with respect to FIG. 1. When a target image impinges on the outer energy sensing area extending beyond the inner area defined by the electrodes 35–38, an error signal is produced at electrode 34 characterized by the frequency $f_2$. The signal is passed by the filter 53 which excludes signals characterized by the frequency $f_1$. The $f_2$ error signal is resolved into its vertical and horizontal components to drive a corresponding elevation and azimuth servo motor to orient the optical or detection axis of the cell 33 with respect to the tracking axis of a remote radiating object.

When the target image impinges on the inner sensing area an error signal is produced characterized by the frequency $f_1$ which is passed by the filter 51. The filter 51 excludes signals of frequency $f_2$. The $f_1$ signal passes through the relay coil 52 to energize the relay and complete a circuit from contact 55 to contact 56 and assume control of the servo system. At the same time the outer sensing area is disabled. The system then operates to orient the detection or optical axis of the cell 33 along the tracking axis of a remote radiation object.

Figure 4:
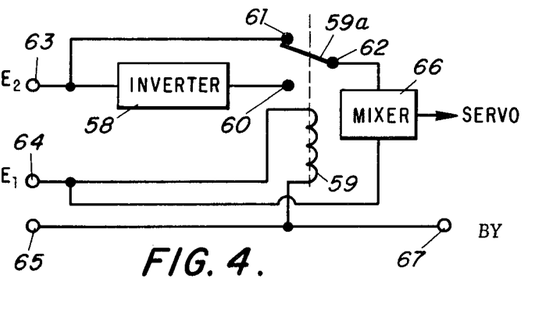
FIG. 4 is a schematic circuit diagram illustrating a still further modification of the apparatus in FIG. 1.

DESCRIPTION AND EXPLANATION OF THE CIRCUIT IN FIG. 4

Referring now to FIG. 4, there is here illustrated a circuit modification for use with the apparatus in FIG. 1. This circuit replaces the circuit surrounding the relay 28. The outer output signal $E_2$ is coupled between a pair of input terminals 63 and 65 and the inner output signal $E_1$ is coupled between a terminal 64 and the terminal 65. The signal $E_2$ is coupled through a relay coil 59 to the terminal 67 and in parallel to a mixer 66. The signal $E_2$ is coupled through an inverter 58 to a contact 60 of the relay 59 and, in parallel, through a contact 61, the pole 59a and pivot contact 62 of the relay 59 to the mixer 66. The output of the mixer 66 is coupled, for example, to the servo circuit.

OPERATION

When a target image impinges on the outer detection area of the cell 20 an error signal $E_2$ is produced which is coupled through the contact 61, pole 59a, and contact 62 to the mixer 66. The signal is directly coupled to the servo circuit which operates to orient the detection or optical axis of the cell 20 along the tracking axis of a remote radiating object. When the target image impinges on cell 10 an error signal $E_1$ is produced which is coupled to the relay coil 59 to energize it and connect the signal $E_2$ through the inverter 58 and then to the mixer 66. The signal $E_1$ then assumes control and tends to orient the system in accordance with the error signals produced from the cell 10. Due to the operation of the inverter 58, an error signal of the form $E_2$ becomes a reject signal. Thus, if a second target image impinges on the cell 20 while a first target image is impinged on the cell 10, the outer detection area operates as a reject zone tending to shy away from the second target while adhering to the first target. The size of the inner detection area corresponding to the cell 10 relative to the outer detection area provided by the cell 20 is adjusted to optimize the ability of the system to reject a spurious or undesired target while continuing to track a desired, acquired target. Thus, for example, with a field of view of 5° for the cell 20 and field of view of 4° for the cell 10, the system can reject spurious targets as close as ½° to the desired target.

In the circuit in FIG. 4 the inverter 58 may be a single stage amplifier circuit and the mixer 66 may be a T-connected resistor network.

Figure 5:
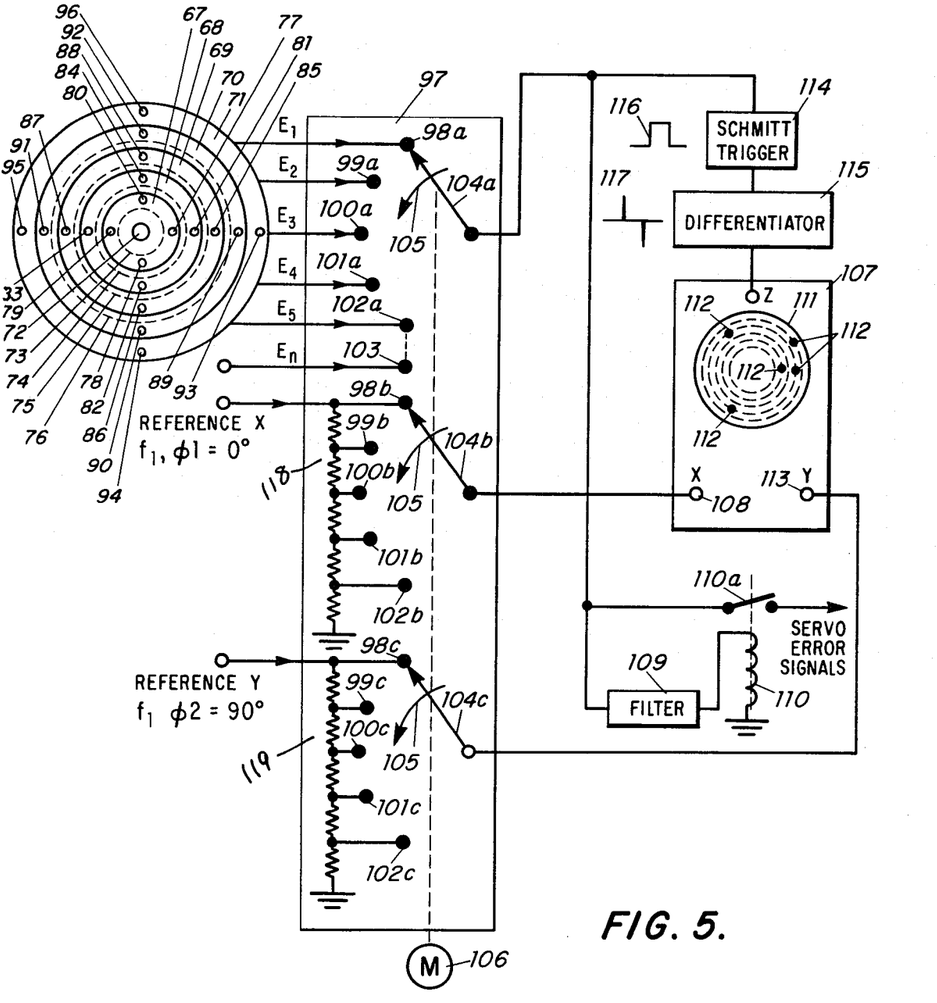
FIG. 5 is a schematic diagram of a yet further modification of the apparatus in FIG. 1.
Figure 6:
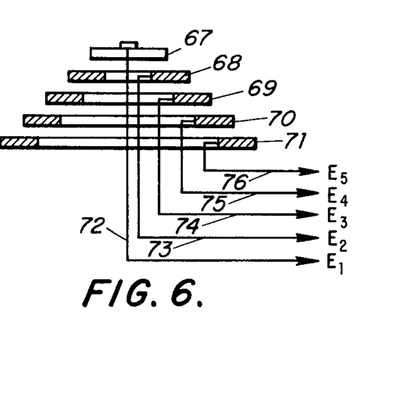
FIG. 6 is an exploded view of the detector cell in FIG. 5, illustrating the output connections.

DESCRIPTION AND EXPLANATION OF THE APPARATUS IN FIGS. 5 AND 6

Referring now to FIGS. 5 and 6, there is here illustrated a modification of the apparatus in FIG. 1 for presenting a display of multiple target indications and for tracking a selected target. Here the multiple element detector has a plurality of overlapping, concentric, continguous radiant energy sensing areas. Each area has a centrally disposed output electrode and at least four input bias electrodes surrounding the central electrode. Each area is quadrature biased as described and illustrated with respect to FIG. 1. The output signals $E_1, E_2, \ldots, E_n$ are coupled to a scanning switch where each signal may be amplified and applied to a scanning terminal. Each output is periodically scanned and applied to the intensity or Z axis of an oscilloscope. The corresponding horizontal and vertical quadrature bias signals are applied to the horizontal and vertical deflection axes of the circuits of the oscilloscope. A plurality of concentric, circular reference baselines are defined by the deflection system of the oscilloscope each corresponding with a selected detection area. The scanner is also coupled through a filter to a relay to control the application of a selected target signal to a servo tracking system.

Thus, a plurality of overlapping, concentric, photoconductive detective cells 67–71, each have a centrally disposed output electrode 72–76, respectively. As shown in the partially sectional view of FIG. 6, the cell 67 is a solid disc and the cells 68–71 each have a central orifice to provide clearance for the connection leads corresponding to the central output electrodes for each cell. The bias electrodes are not shown in the view of FIG. 6. The cell 67 has a set of four input bias electrodes, 77–80 which define an innermost detection area. The cells 68–71 have input bias electrodes 81–84, 85–88, 89–92, 93–96, respectively. The cells 68–71 are concentrically arranged in succeeding, continguous, annular detection areas. The output signals $E_1$–$E_5$ are coupled to corresponding input terminals 98a–102a of a triple pole, ganged, rotary scanning switch circuit 97 having a motor 106 which drives ganged rotary contact arms 104a, 104b and 104c. An input terminal 103 corresponds with an input signal $E_n$ which indicates that the number of signals is not limited and may be arbitrarily selected. The arms 104 are schematically shown as moving in the direction indicated by an arrow 105 periodically to contact each of the input terminals 98–102. The circuit 97 may include pre-amplifiers for each of the signals $E_1$–$E_5$. The scanning pole 104a is coupled through a Schmitt Trigger circuit 114 and differentiator 115 to the Z axis or intensity control of an oscilloscope 107. The horizontal or zero degree bias signal for the cells is coupled from terminals 98b–102b through a rotary contact arm 104b to the X axis of the oscilloscope. The vertical or quadrature bias signal is coupled from terminals 98c–102c through the rotary contact to the Y axis. The terminals 98b–102b are coupled to a potentiometer 118 which is coupled to a source of reference X bias signal of frequency $f_1$ and phase $\Phi 1 = 0°$. The terminals 98c–102c are coupled to a potentiometer 119 which is coupled to reference Y bias signal of frequency $f_1$ and quadrature phase $\Phi 2 = 90°$. The bias signals from each of the terminals 98b–102b and 98c–102c, respectively, produce a circular scope sweep corresponding with a selected annular detection area. An output of the pole 104a may be coupled to a filter 109 to a control relay 110 which controls the application of a selected signal through a contact 110a of the relay to a servo system. The servo tends to orient the detection or optical axis of the cells with the tracking axis of a desired remote target. The indicated output of the oscilloscope appears on the face 111 and a plurality of targets 112 are shown illuminated on the face of the scope.

OPERATION

With the composite detector cell placed in an optical seeker which focuses images of a plurality of remote objects on the various cells, each cell having an image impingent thereon produces an output signal which is coupled to the circuit 97. The input terminals 98a–102 a are periodically scanned, for example, at the rate of 30 cycles per second or higher with, e.g., an electronic switch. The bias frequency coupled to the cells may be of the order of 40 or 50 kilocycles. During a scan cycle at each input terminal, each cell produces a large number, for example, hundreds, of signals indicative of the presence of a target. The signals from each of the detection areas are changed to a square wave 116 and differentiated to provide "spike" pulses 117 which trigger the Z axis of the scope 107 to intensify the electron beam and produce a bright spot 112 at a point in the circular scan which corresponds to the selected detector region.

From the potentiometers 118 and 119, the switch circuit 97 simultaneously produces X and Y sweep signals to the scope 107 to provide a circular sweep corresponding to a respective signal $E_1$, $E_2$. The gain may be so adjusted that the circular trace is held just below a visible level until such time as a target image intensifies the beam and produces an indication 112 on the face 111 of the scope. For a selected target a signal is coupled through the filter 109 to energize the relay 110 and apply that signal to the servo system to orient the detection axis of the cell along the tracking axis of the selected target.

It will be apparent from the foregoing discussion that the present invention has broad application to the problem of detection, indication and tracking of remote radiating objects.

While there has hereinbefore been presented what is at present considered to be the preferred embodiments of the invention, it will be apparent to those of ordinary skill in the art that many modifications and changes may be made thereto without departing from the true spirit and scope of the invention. It will be considered, therefore, that all those changes and modifications which fall fairly within the scope of the invention will be a part of the invention.

What is claimed is:

1. Radiant energy sensing apparatus, comprising:
radiant energy detection means having a plurality of coaxial radiation responsive elements surrounding a detection axis;
alternating current bias means coupled to said detection means for coupling quadrature phased bias signals through said elements; and
means coupled to said detection means for producing an output signal.

2. Light energy sensing apparatus, comprising:
focusing means for receiving an optical image of a remote light transmitting object;
light energy detection means coupled to said focusing means and having a plurality of coaxial photoelectric light responsive elements surrounding a detection axis;
a first alternating current bias means coupled to said detection means for coupling a first pair of quadrature phased bias signals through an inner of said elements;
a second alternating current bias means coupled to said detection means for coupling a second pair of quadrature phased bias signals through an outer of said elements; and
filter means coupled to said detection means for producing an output signal indicative of an object signal within said light responsive areas.

3. Light energy sensing apparatus, comprising:
focusing means for receiving an optical image of a remote light transmitting object;
light energy detection means coupled to said focusing means and having a plurality of coaxial photoelectric light responsive elements surrounding a detection axis;
a first alternating current bias means coupled to said detection means for coupling a first pair of quadrature phased bias signals at a first frequency through an inner of said elements;
a second alternating current bias means coupled to said detection means for coupling a second pair of quadrature phased bias signals at a second frequency through an outer of said elements;

inner filter means coupled to said inner element for producing a first frequency output signal indicative of an object signal within said inner element; and outer filter means coupled to said outer element for producing a second frequency output signal indicative of an object signal within said outer element.

4. Light energy sensing apparatus, comprising:

focusing means for receiving an optical image of a remote light transmitting object;

light energy detection means coupled to said focusing means and having a plurality of coaxial photoelectric light responsive elements surrounding a detection axis;

a first alternating current bias means coupled to said detection means for coupling a first pair of quadrature phased bias signals at a first frequency through an inner of said elements;

a second alternating current bias means coupled to said detection means for coupling a second pair of quadrature phased bias signals at a second frequency through an outer of said elements;

inner filter means coupled to said inner element for producing a first frequency output signal indicative of an object signal within said inner element;

outer filter means coupled to said outer element for producing a second frequency output signal indicative of an object signal within said outer elements; and switching means coupled to said inner and outer filter means for disabling, in response to said first frequency output signal, said second frequency output signal.

5. Light energy sensing apparatus, comprising:

focusing means for receiving an optical image of a remote light transmitting object;

light energy detection means coupled to said focusing means and having a plurality of coaxial photoelectric light responsive areas surrounding a detection axis, each of said areas being in insulated overlapping relation and having a plurality of input bias electrodes and an output centrally disposed electrode;

a first alternating current bias means coupled to said detection means for coupling a first pair of quadrature phased bias signals through said input bias electrodes of an inner of said areas;

a second alternating current bias means coupled to said detection means for coupling a second pair of quadrature phased bias signals through said input bias electrodes of an outer of said areas;

inner filter means coupled to said detection means through said output electrode of said inner area for producing a first output signal indicative of an object signal within said inner area; and outer filter means coupled to said detection means through said output electrode of said outer area for producing a second output signal indicative of an object signal within said outer area.

6. Light energy sensing apparatus, comprising:

focusing means for receiving an optical image of a remote light transmitting object;

light energy detection means coupled to said focusing means and having a plurality of coaxial photoelectric light responsive areas surrounding a detection axis, each of said areas being in insulated overlapping relation and having a plurality of input bias electrodes and an output centrally disposed electrode;

a first alternating current bias means coupled to said detection means for coupling a first pair of quadrature phased bias signals through said input bias electrodes of an inner of said areas;

a second alternating current bias means coupled to said detection means for coupling a second pair of quadrature phased bias signals through said input bias electrodes of an outer of said areas;

inner filter means coupled to said detection means through said output electrode of said inner area for producing a first output signal indicative of an object signal within said inner area;

outer filter means coupled to said detection means through said output electrode of said outer area for producing a second output signal indicative of an object signal within said outer area; and switching means coupled to said inner and outer filter means for disabling, in response to said first output signal, said second output signal.

7. Light energy sensing apparatus, comprising:

focusing means for receiving an optical image of a remote light transmitting object;

light energy detection means coupled to said focusing means and having a plurality of coaxial photoelectric light responsive areas surrounding a detection axis, each of said areas, being in insulated overlapping relation and having a plurality of input bias electrodes and an output centrally disposed electrode;

a first alternating current bias means coupled to said detection means for coupling a first pair of quadrature phased bias signals through said input bias electrodes of an inner of said area;

a second alternating current bias means coupled to said detection means for coupling a second pair of quadrature phased bias signals through said input bias electrodes of an outer of said areas;

inner filter means coupled to said detection means through said output electrode of said inner area for producing a first output signal indicative of an object signal within said inner area;

outer filter means coupled to said detection means through said output electrode of said outer area for producing a second output signal indicative of an object signal within said outer ares;

inverter means coupled to said outer means for inverting said second output signal;

switching means coupled to said inner filter, outer filter and inverter means for coupling said second output signal through said inverter means only in response to said first output signal; and mixer means coupled to said inverter and inner filter means tending to reject in response to said first output signal, said second output signal from said inner area.

8. Light energy sensing apparatus, comprising:

movable focusing means for receiving an optical image of a remote light transmitting object along a tracking axis;

drive means coupled to said focusing means for orienting said focusing means;

light energy detection means carried by said focusing means and having a plurality of coaxial photoelectric light responsive areas surrounding a detection axis;

a first alternating current bias means coupled to said detection means for coupling a first pair of quadrature phased bias signals through an inner of said areas;

a second alternating current bias means coupled to said detection means for coupling a second pair of quadrature phased bias signals through an outer of said areas;

output means coupled to said detection means for producing an output signal indicative of an object signal within said light responsive areas; and tracking means coupled to said output and drive means for orienting said focusing means along said tracking axis in response to said output signal.

9. Light energy sensing and tracking apparatus, comprising:

movable focusing means for receiving an optical image of a remote light transmitting object along a tracking axis;

drive means coupled to said focusing means for orienting said focusing means;

light energy detection means carried by said focusing means and having a plurality of coaxial photoelectric light responsive areas surrounding a detection axis;

a first alternating current bias means coupled to said detection means for coupling a first pair of quadrature phased bias signals at a first frequency through an inner of said areas;

a second alternating current bias means coupled to said detection means for coupling a second pair of quadrature phased bias signals at a second frequency through an outer of said areas;

inner filter means coupled to said inner area for producing a first frequency output signal indicative of an object signal within said inner area;

outer filter means coupled to said outer area for producing a second frequency output signal indicative of an object signal within said outer areas; and tracking means coupled to said inner filter, outer filter and drive means for orienting said focusing means to align said detection axis along said tracking axis in response to said output signals.

10. Light energy sensing apparatus, comprising:

movable focusing means for receiving an optical image of a remote light transmitting object along a tracking axis;

drive means coupled to said focusing means for orienting said focusing means;

light energy detection means carried by said focusing means and having a plurality of coaxial photoelectric light responsive areas surrounding a detection axis, each of said areas being in insulated overlapping relation and having a plurality of input bias electrodes and an output centrally disposed electrode;

a first alternating current bias means coupled to said detection means for coupling a first pair of quadrature phased bias signals through said input bias electrodes of an inner of said areas;

a second alternating current bias means coupled to said detection means for coupling a second pair of quadrature phased bias signals through said input bias electrodes of an outer of said areas;

inner filter means coupled to said detection means through said output electrode of said inner area for producing a first output signal indicative of an object signal within said inner area;

outer filter means coupled to said detection means through said output electrode of said outer area for producing a second output signal indicative of an object signal within said outer area; and tracking means coupled to said inner filter, outer and drive means for orienting said focusing means to align said detection axis along said tracking axis in response to said output signals.

11. Light energy sensing apparatus, comprising:

focusing means for receiving an optical image of a remote light transmitting object;

light energy detection means coupled to said focusing means and having a plurality of coaxial photoelectric light responsive areas surrounding a detection axis, each of said areas having four symmetrically disposed input bias electrodes defining a pair of mutually orthogonal reference axes and a centrally disposed output electrode;

a first alternating current bias means coupled to said detection means for coupling a first pair of quadrature phased bias signals through said four input bias electrodes of an inner of said areas;

a second alternating current bias means coupled to said detection means for coupling a second pair of quadrature phased bias signals through said four inner bias electrodes of an outer of said areas; and means coupled to said detection means through said output electrodes for producing an output signal.

12. Light energy sensing apparatus, comprising:

focusing means for simultaneously receiving optical images of a plurality of remote light transmitting objects;

light energy detection means coupled to said focusing means and having a plurality of concentric photoelectric light responsive areas surrounding a detection axis, each of said areas being in insulated overlapping relation and having a plurality of input bias electrodes and an output centrally disposed electrode;

alternating current bias means coupled to said detection means for coupling a pair of quadrature phased bias signals through said input bias electrodes of each said area;

scanning means coupled to said detection means through said output electrode of each said area for sequentially producing an output signal indicative of an object signal within each said area; and display means coupled to said scanning means and said bias means for producing indications of said images with respect to a plurality of concentric reference curves corresponding to said areas respectively.

13. Light energy sensing apparatus, comprising:

movable focusing means for simultaneously receiving optical images of a plurality of remote light transmitting objects;

drive means coupled to said focusing means for orienting said focusing means;

light energy detection means carried by said focusing means and having a plurality of concentric photoelectric light responsive areas surrounding a detection axis, each of said areas being in insulated overlapping relation and having a plurality of input bias electrodes and an output centrally disposed electrode;

alternating current bias means coupled to said detection means for coupling a pair of quadrature phased bias signals through said input bias electrodes of each said area;

scanning means coupled to said detection means through said output electrode of each said area for sequentially producing an output signal indicative of an object signal within each said area;

display means coupled to said scanning means and said bias means for producing indications of said images with respect to a plurality of concentric reference curves each corresponding to one of said areas; and tracking means coupled to said scanning and drive means for orienting said focusing means to align said detection axis along a tracking axis corresponding with a selected one of said objects in response to a selected one of said output signals corresponding with said selected object.

14. Light energy sensing apparatus, comprising:

focusing means for receiving an optical image of a remote light transmitting object along a tracking axis;

drive means coupled to said focusing means for orienting said focusing means;

light energy detection means carried by said focusing means and having a plurality of coaxial photoelectric light responsive areas surrounding a detection axis, each of said areas, being in insulated overlapping relation and having a plurality of input bias electrodes and an output centrally disposed electrode;

a first alternating current bias means coupled to said detection means for coupling a first pair of quadrature phased bias signals through said input bias electrodes of an inner of said area;

a second alternating current bias means coupled to said detection means for coupling a second pair of quadrature phased bias signals through said input bias electrodes of an outer of said area;

inner filter means coupled to said detection means through said output electrode of said inner area for producing a first output signal indicative of an object signal within said inner area;

outer filter means coupled to said detection means through said output electrode of said outer area for producing a second output signal indicative of an object signal within said outer area;

inverter means coupled to said outer means for inverting said second output signal;

switching means coupled to said inner filter, outer and inverter means for coupling said second output signal through said inverter means only in response to said first output signal; and mixer means coupled to said inverter and inner filter means tending to reject, in response to said first output signal, said second output signal from said inner area; and tracking means coupled to said mixer and drive means for orienting said focusing mean to align said detection axis along said tracking axis, whereby said apparatus tends to reject an image in said outer area only in response to an image in said inner area.

15. Radiant energy detection means, comprising:

base means;

radiant energy responsive material coating said base means for providing a detection surface relative to a detection axis which changes an electrical characteristic in response to said energy;

an inner bias electrode means having at least four coupling points each symmetrically radially disposed relative to said detection axis and providing a boundary for an inner radiation response area on said surface;

an inner output electrode means centrally disposed relative to said inner bias coupling points;

an outer bias electrode means having at least four coupling points arranged in a radially symmetric pattern, relative to said detection axis, surrounding said inner bias electrode means to provide a boundary for an outer radiation responsive area surrounding said inner area; and an outer output electrode means centrally disposed relative to said outer coupling points.

* * * * *